(12) United States Patent  (10) Patent No.: US 11,982,789 B2
Lian et al.  (45) Date of Patent: May 14, 2024

(54) OPTICAL LENS ASSEMBLY

(71) Applicant: GENIUS ELECTRONIC OPTICAL (XIAMEN) CO., LTD., Fujian (CN)

(72) Inventors: Jiali Lian, Fujian (CN); Hung-Chien Hsieh, Fujian (CN); Huabin Liao, Fujian (CN); Lanlan Zhang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 256 days.

(21) Appl. No.: 17/115,797

(22) Filed: Dec. 9, 2020

(65) Prior Publication Data

US 2022/0091374 A1  Mar. 24, 2022

(30) Foreign Application Priority Data

Sep. 24, 2020 (CN) .......................... 202011013664.3

(51) Int. Cl.
*G02B 13/00* (2006.01)
*G02B 9/12* (2006.01)
*G02B 27/00* (2006.01)

(52) U.S. Cl.
CPC .......... *G02B 13/0035* (2013.01); *G02B 9/12* (2013.01); *G02B 27/0025* (2013.01)

(58) Field of Classification Search
CPC .... G02B 9/12; G02B 13/0035; G02B 13/005; G02B 27/0025; G02B 2003/0093; G02B 30/33
See application file for complete search history.

(56) References Cited

U.S. PATENT DOCUMENTS 6,253,033 B1  6/2001  Hasushita

FOREIGN PATENT DOCUMENTS

| CN | 207516710 | 6/2018 |
| CN | 108279485 | 7/2018 |
| TW | I680322 | 12/2019 |

OTHER PUBLICATIONS

Office Action of Taiwan Counterpart Application, dated May 28, 2021, pp. 1-8.

*Primary Examiner* — Jack Dinh
(74) *Attorney, Agent, or Firm* — JCIPRNET

(57) ABSTRACT

An optical lens assembly including a first lens element, a second lens element and a third lens element is provided. A periphery region of a light incident surface of the first lens element is concave. The second lens element has positive refracting power, and an optical axis region of a light incident surface of the second lens element is concave. A periphery region of a light exit surface of the third lens element is concave, and an optical axis region of a light incident surface of the third lens element is convex. The lens elements of the optical lens assembly only include the first lens element to the third lens element, and a thickness of the first lens element along an optical axis is greater than or equal to a sum of two air gaps from the first lens element to the third lens element along the optical axis.

6 Claims, 20 Drawing Sheets

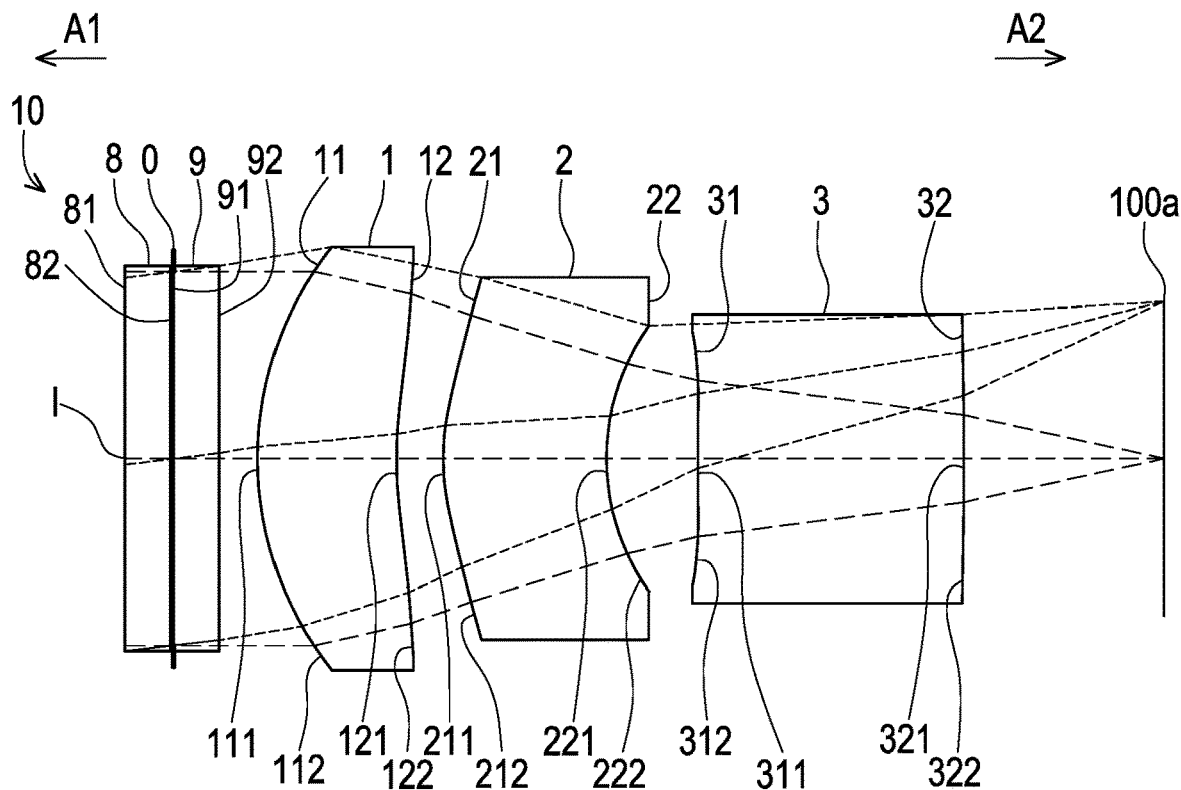
FIG. 7
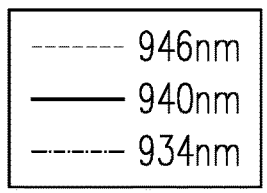
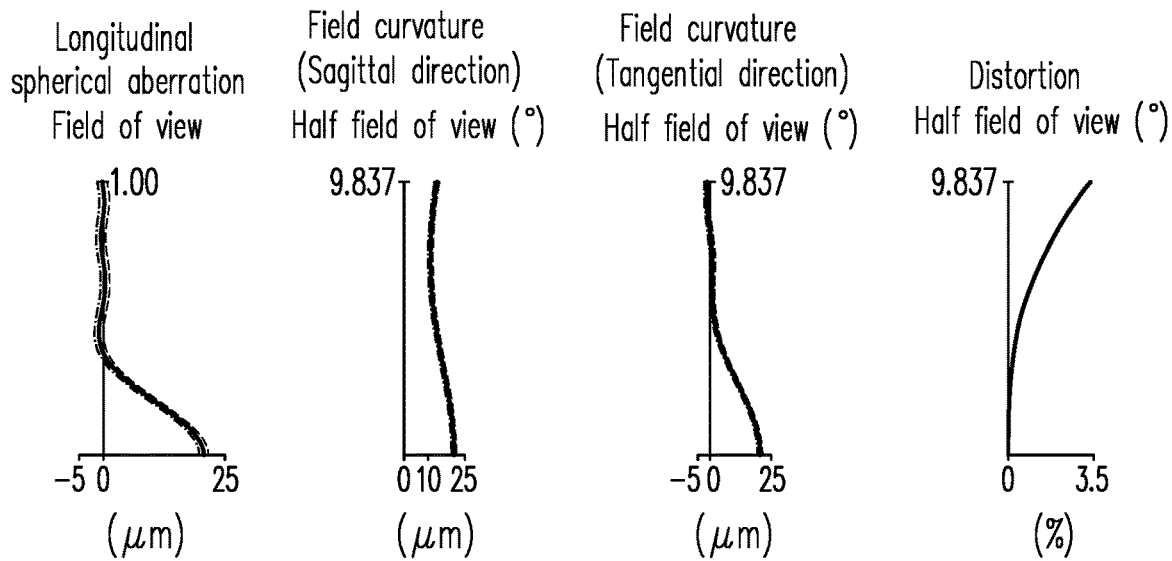
FIG. 8A    FIG. 8B    FIG. 8C    FIG. 8D

| First embodiment ||||||
|---|---|---|---|---|---|
| EFL=2.787 mm, HFOV=9.837°, DL=3.295 mm, Fno=2.342, LCR=0.500 mm . ||||||
| Element | Surface | Radius (mm) | Thickness (mm) | Refractive index | Abbe number | Focal length (mm) |
| Object | | Infinity | Infinity | | | |
| First protection glass 8 | Light exit surface 81 | Infinity | 0.145 | 1.458 | 67.821 | |
| | Light incident surface 82 | Infinity | 0.010 | 1.458 | 67.821 | |
| Aperture stop 0 | | Infinity | 0.000 | | | |
| Second protection glass 9 | Light exit surface 91 | Infinity | 0.145 | 1.458 | 67.821 | |
| | Light incident surface 92 | Infinity | 0.120 | | | |
| First lens element 1 | Light exit surface 11 | 1.024 | 0.442 | 1.636 | 20.373 | 3.828 |
| | Light incident surface 12 | 1.474 | 0.148 | | | |
| Second lens element 2 | Light exit surface 21 | 0.796 | 0.514 | 1.633 | 20.373 | 2579.659 |
| | Light incident surface 22 | 0.597 | 0.295 | | | |
| Third lens element 3 | Light exit surface 31 | 101.357 | 0.843 | 1.633 | 20.373 | 31.115 |
| | Light incident surface 32 | -24.389 | 0.634 | | | |
| Multiple-light source generating unit PM | Light-emitting surface 100a | Infinity | | | | |

FIG. 9

| Surface | $a_4$ | $a_6$ | $a_8$ | $a_{10}$ | $a_{12}$ |
|---|---|---|---|---|---|
| 11 | -3.895089E-02 | -2.029900E-01 | 4.604683E-01 | -1.439641E-01 | -5.737328E+00 |
| 12 | -9.587055E-01 | 1.104057E+00 | -1.839852E+00 | 1.169304E+01 | -4.171833E+01 |
| 21 | -1.278384E+00 | -1.312540E+00 | 6.372193E+00 | -1.486965E+00 | -1.902391E+00 |
| 22 | -1.316882E+00 | -3.985159E-01 | -7.377268E+01 | 1.257880E+03 | -8.826608E+03 |
| 31 | -3.549379E-01 | -7.148916E+00 | 8.439162E+01 | -6.537345E+02 | 2.833068E+03 |
| 32 | -1.130643E-01 | 1.127948E+00 | 1.244412E+00 | -1.840562E+02 | 1.818110E+03 |
| Surface | $a_{14}$ | $a_{16}$ | | | |
| 11 | 1.653631E+01 | -1.330773E+01 | | | |
| 12 | 7.751362E+01 | -5.636438E+01 | | | |
| 21 | -2.133380E+01 | 2.764875E+01 | | | |
| 22 | 3.047296E+04 | -3.912281E+04 | | | |
| 31 | -5.088996E+03 | 1.997751E+03 | | | |
| 32 | -7.185905E+03 | 1.039815E+04 | | | |

FIG. 10

| Second embodiment ||||||
|---|---|---|---|---|---|
| EFL=3.099 mm, HFOV=9.192°, DL=4.306 mm, Fno=2.605, LCR=0.500 mm . ||||||
| Element | Surface | Radius (mm) | Thickness (mm) | Refractive index | Abbe number | Focal length (mm) |
| Object | | Infinity | Infinity | | | |
| First protection glass 8 | Light exit surface 81 | Infinity | 0.145 | 1.458 | 67.821 | |
| | Light incident surface 82 | Infinity | 0.010 | 1.458 | 67.821 | |
| Aperture stop 0 | | Infinity | 0.000 | | | |
| Second protection glass 9 | Light exit surface 91 | Infinity | 0.145 | 1.458 | 67.821 | |
| | Light incident surface 92 | Infinity | 0.120 | | | |
| First lens element 1 | Light exit surface 11 | 1.087 | 0.714 | 1.632 | 20.373 | 72.684 |
| | Light incident surface 12 | 0.830 | 0.356 | | | |
| Second lens element 2 | Light exit surface 21 | 0.724 | 0.652 | 1.634 | 20.373 | 4.963 |
| | Light incident surface 22 | 0.612 | 0.265 | | | |
| Third lens element 3 | Light exit surface 31 | 3.636 | 1.014 | 1.633 | 20.373 | 2.355 |
| | Light incident surface 32 | -2.255 | 0.885 | | | |
| Multiple-light source generating unit PM | Light-emitting surface 100a | Infinity | | | | |

FIG. 13

| Surface | $a_4$ | $a_6$ | $a_8$ | $a_{10}$ | $a_{12}$ |
|---|---|---|---|---|---|
| 11 | -4.478801E-02 | 2.664019E-02 | -1.353710E-01 | 6.377764E-01 | -1.241505E+00 |
| 12 | -4.696619E-01 | 5.801897E-01 | -1.716850E+00 | 1.010908E+01 | -2.572566E+01 |
| 21 | -6.073550E-01 | -8.905195E-02 | -2.088207E+00 | 1.262532E+01 | -3.691003E+01 |
| 22 | -8.389963E-01 | -1.786581E+00 | 7.047489E+00 | -2.657446E+01 | 2.238954E+02 |
| 31 | -3.045460E-01 | -6.586670E-01 | 1.805579E+00 | -8.193196E+00 | 9.972392E+01 |
| 32 | -1.434612E-01 | -1.803703E-01 | 2.902070E-01 | 1.641941E+00 | -9.086429E+00 |
| Surface | $a_{14}$ | $a_{16}$ | | | |
| 11 | 9.645029E-01 | -1.492468E-01 | | | |
| 12 | 1.725886E+01 | 1.612022E+01 | | | |
| 21 | 4.633614E+01 | -3.177181E+01 | | | |
| 22 | -1.055959E+03 | 1.387313E+03 | | | |
| 31 | -3.496498E+02 | 2.839894E+02 | | | |
| 32 | 1.611909E+01 | -1.098040E+01 | | | |

FIG. 14

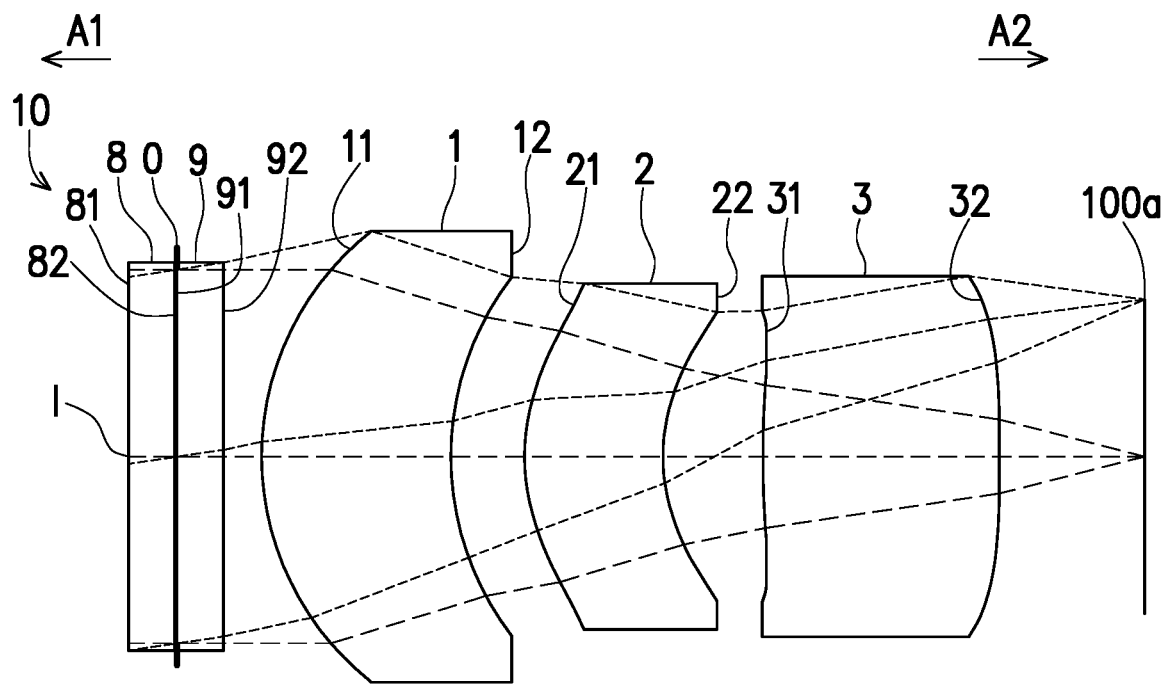
FIG. 15
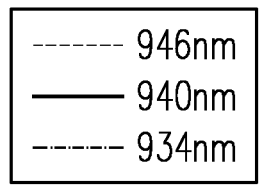
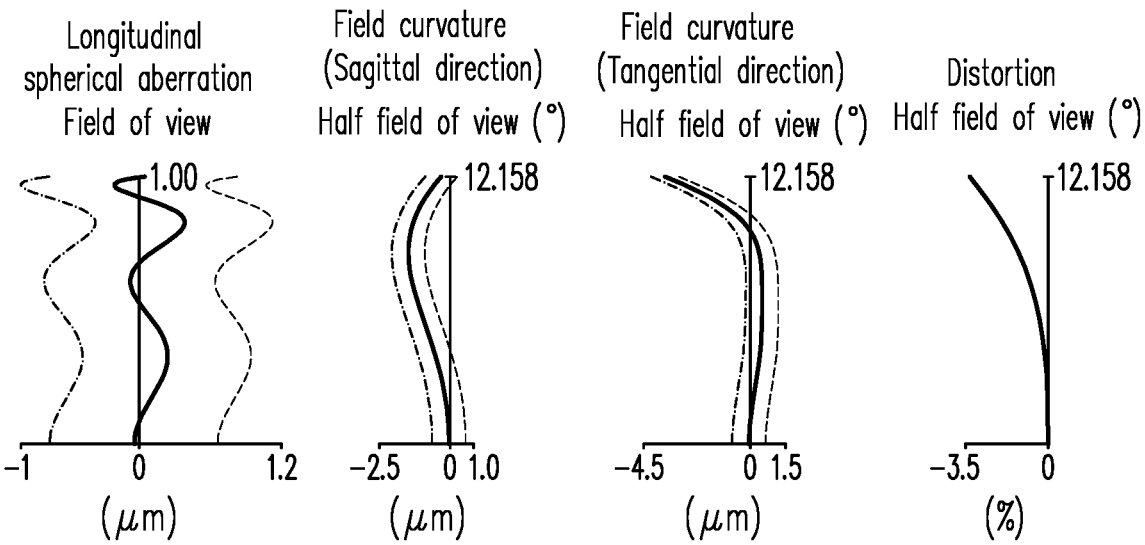
FIG. 16A  FIG. 16B  FIG. 16C  FIG. 16D

| Third embodiment | | | | | | |
|---|---|---|---|---|---|---|
| EFL=2.391 mm, HFOV=12.158°, DL=3.224 mm, Fno=2.009, LCR=0.500 mm . | | | | | | |
| Element | Surface | Radius (mm) | Thickness (mm) | Refractive index | Abbe number | Focal length (mm) |
| Object | | Infinity | Infinity | | | |
| First protection glass 8 | Light exit surface 81 | Infinity | 0.145 | 1.458 | 67.821 | |
| | Light incident surface 82 | Infinity | 0.010 | 1.458 | 67.821 | |
| Aperture stop 0 | | Infinity | 0.000 | | | |
| Second protection glass 9 | Light exit surface 91 | Infinity | 0.145 | 1.458 | 67.821 | |
| | Light incident surface 92 | Infinity | 0.120 | | | |
| First lens element 1 | Light exit surface 11 | 0.898 | 0.603 | 1.633 | 20.373 | 5.960 |
| | Light incident surface 12 | 0.872 | 0.234 | | | |
| Second lens element 2 | Light exit surface 21 | 0.666 | 0.438 | 1.636 | 20.373 | 6.789 |
| | Light incident surface 22 | 0.586 | 0.317 | | | |
| Third lens element 3 | Light exit surface 31 | 2.795 | 0.750 | 1.633 | 20.373 | 3.444 |
| | Light incident surface 32 | -8.897 | 0.462 | | | |
| Multiple-light source generating unit PM | Light-emitting surface 100a | Infinity | | | | |

FIG. 17

| Surface | $a_4$ | $a_6$ | $a_8$ | $a_{10}$ | $a_{12}$ |
|---|---|---|---|---|---|
| 11 | -3.871772E-02 | 4.961736E-02 | -2.193800E-01 | 4.323259E-01 | -9.097980E-01 |
| 12 | -3.801521E-01 | 7.389948E-01 | -2.259276E+00 | 7.646163E+00 | -1.522908E+01 |
| 21 | -7.199819E-01 | -5.397373E-01 | -2.229303E+00 | -1.824523E+00 | 2.150325E+01 |
| 22 | -5.891888E-01 | -9.269394E-01 | -2.325392E+01 | 1.754794E+02 | -4.780580E+02 |
| 31 | -4.785887E-01 | -8.301678E-01 | -2.797525E+00 | -1.673515E+00 | 3.262979E+01 |
| 32 | -4.964989E-01 | -1.234148E+00 | 4.206857E+00 | -1.696703E+01 | 5.416717E+01 |
| Surface | $a_{14}$ | $a_{16}$ | | | |
| 11 | 3.037004E+00 | -3.660913E+00 | | | |
| 12 | 8.527880E+01 | -1.873946E+02 | | | |
| 21 | -1.001094E+01 | -1.748459E+02 | | | |
| 22 | -7.597486E+02 | 3.321136E+03 | | | |
| 31 | -1.733137E+02 | -5.147577E+02 | | | |
| 32 | -1.052417E+02 | 8.948272E+01 | | | |

FIG. 18

| Fourth embodiment |||||||
|---|---|---|---|---|---|---|
| EFL=3.239 mm, HFOV=8.609°, DL=3.769 mm, Fno=2.700, LCR=0.500 mm . |||||||
| Element | Surface | Radius (mm) | Thickness (mm) | Refractive index | Abbe number | Focal length (mm) |
| Object | | Infinity | Infinity | | | |
| First protection glass 8 | Light exit surface 81 | Infinity | 0.145 | 1.458 | 67.821 | |
| | Light incident surface 82 | Infinity | 0.010 | 1.458 | 67.821 | |
| Aperture stop 0 | | Infinity | 0.000 | | | |
| Second protection glass 9 | Light exit surface 91 | Infinity | 0.145 | 1.458 | 67.821 | |
| | Light incident surface 92 | Infinity | 0.120 | | | |
| First lens element 1 | Light exit surface 11 | 1.095 | 0.867 | 1.634 | 20.373 | 4.429 |
| | Light incident surface 12 | 1.244 | 0.113 | | | |
| Second lens element 2 | Light exit surface 21 | 0.783 | 0.411 | 1.637 | 20.373 | 71.822 |
| | Light incident surface 22 | 0.634 | 0.345 | | | |
| Third lens element 3 | Light exit surface 31 | 100.105 | 0.958 | 1.633 | 20.373 | 12.745 |
| | Light incident surface 32 | -8.749 | 0.654 | | | |
| Multiple-light source generating unit PM | Light-emitting surface 100a | Infinity | | | | |

FIG. 21

| Surface | $a_4$ | $a_6$ | $a_8$ | $a_{10}$ | $a_{12}$ |
|---|---|---|---|---|---|
| 11 | -3.198350E-02 | -1.135549E-01 | 7.303226E-01 | -2.987359E+00 | 7.216304E+00 |
| 12 | -2.373170E+00 | 5.535247E+00 | -2.982273E+00 | 5.772920E-01 | -7.673891E+01 |
| 21 | -3.286544E+00 | -2.554712E+00 | 6.129550E+01 | -1.153217E+02 | -4.476447E+02 |
| 22 | -2.725316E+00 | 3.265907E-01 | 5.857670E+01 | 2.675653E+02 | -6.862842E+03 |
| 31 | -5.216946E-01 | -3.810574E+00 | 6.715890E+01 | -4.603784E+02 | 1.788440E+03 |
| 32 | -2.916286E-01 | 5.082699E+00 | -7.962937E+01 | 7.348856E+02 | -3.827828E+03 |
| Surface | $a_{14}$ | $a_{16}$ | | | |
| 11 | -9.386624E+00 | 5.183872E+00 | | | |
| 12 | 3.241706E+02 | -4.034791E+02 | | | |
| 21 | 2.229735E+03 | -2.866273E+03 | | | |
| 22 | 4.123207E+04 | -8.534867E+04 | | | |
| 31 | -2.000339E+03 | -4.204442E+03 | | | |
| 32 | 1.059328E+04 | -1.214028E+04 | | | |

FIG. 22

| Fifth embodiment |||||||
|---|---|---|---|---|---|---|
| EFL=1.752 mm, HFOV=15.363°, DL=2.748 mm, Fno=2.200, LCR=0.500 mm . |||||||
| Element | Surface | Radius (mm) | Thickness (mm) | Refractive index | Abbe number | Focal length (mm) |
| Object | | Infinity | Infinity | | | |
| First protection glass 8 | Light exit surface 81 | Infinity | 0.145 | 1.458 | 67.821 | |
| | Light incident surface 82 | Infinity | 0.010 | 1.458 | 67.821 | |
| Aperture stop 0 | | Infinity | 0.000 | | | |
| Second protection glass 9 | Light exit surface 91 | Infinity | 0.145 | 1.458 | 67.821 | |
| | Light incident surface 92 | Infinity | 0.120 | | | |
| First lens element 1 | Light exit surface 11 | 0.878 | 0.681 | 1.633 | 20.373 | 4.771 |
| | Light incident surface 12 | 0.866 | 0.126 | | | |
| Second lens element 2 | Light exit surface 21 | 0.634 | 0.468 | 1.633 | 20.373 | 2.742 |
| | Light incident surface 22 | 0.713 | 0.193 | | | |
| Third lens element 3 | Light exit surface 31 | 3.272 | 0.750 | 1.633 | 20.373 | 5.151 |
| | Light incident surface 32 | -1000.000 | 0.109 | | | |
| Multiple-light source generating unit PM | Light-emitting surface 100a | Infinity | | | | |

FIG. 25

| Surface | $a_4$ | $a_6$ | $a_8$ | $a_{10}$ | $a_{12}$ |
|---|---|---|---|---|---|
| 11 | -2.628854E-02 | 1.925417E-02 | -1.670310E-01 | 4.847660E-01 | -1.136655E+00 |
| 12 | -4.505631E-01 | 7.963144E-01 | -1.853598E+00 | 7.883739E+00 | -1.255602E+01 |
| 21 | -7.009874E-01 | -3.056367E-01 | -3.620430E+00 | -2.110354E+00 | 3.324320E+01 |
| 22 | 3.077633E-01 | -2.949134E-01 | -2.137838E+01 | 1.722014E+02 | -4.013479E+02 |
| 31 | -4.778538E-01 | -1.328462E+00 | -3.319898E+00 | 3.895195E+00 | -1.350863E+01 |
| 32 | 8.609334E-01 | -5.063389E+00 | 2.891779E+00 | -2.037671E+01 | 4.622994E+01 |
| Surface | $a_{14}$ | $a_{16}$ | | | |
| 11 | 2.647800E+00 | -2.390523E+00 | | | |
| 12 | 1.025717E+02 | -1.817125E+02 | | | |
| 21 | 1.093352E+01 | -3.166289E+02 | | | |
| 22 | -7.597486E+02 | 3.321136E+03 | | | |
| 31 | -1.733137E+02 | -5.147577E+02 | | | |
| 32 | -7.667036E+01 | 3.634471E+02 | | | |

FIG. 26

| Condition | First embodiment | Second embodiment | Third embodiment | Fourth embodiment | Fifth embodiment |
|---|---|---|---|---|---|
| T1 | 0.442 | 0.714 | 0.603 | 0.867 | 0.681 |
| G12 | 0.148 | 0.356 | 0.234 | 0.113 | 0.126 |
| T2 | 0.514 | 0.652 | 0.438 | 0.411 | 0.468 |
| G23 | 0.295 | 0.265 | 0.317 | 0.345 | 0.193 |
| T3 | 0.843 | 1.014 | 0.750 | 0.958 | 0.750 |
| BFL | 0.634 | 0.885 | 0.462 | 0.654 | 0.109 |
| EFL | 2.787 | 3.099 | 2.391 | 3.239 | 1.752 |
| TL | 2.241 | 3.001 | 2.342 | 2.695 | 2.218 |
| TTL | 2.875 | 3.886 | 2.804 | 3.349 | 2.328 |
| ALT | 1.799 | 2.380 | 1.791 | 2.236 | 1.899 |
| AAG | 0.442 | 0.621 | 0.551 | 0.459 | 0.319 |
| DL | 3.295 | 4.306 | 3.224 | 3.769 | 2.748 |
| Tavg | 0.600 | 0.793 | 0.597 | 0.745 | 0.633 |
| Gavg | 0.221 | 0.311 | 0.276 | 0.229 | 0.159 |

FIG. 27

| Condition | First embodiment | Second embodiment | Third embodiment | Fourth embodiment | Fifth embodiment |
|---|---|---|---|---|---|
| EFL/BFL | 4.398 | 3.503 | 5.174 | 4.955 | 16.002 |
| (T2+T3)/G23 | 4.604 | 6.298 | 3.744 | 3.964 | 6.300 |
| TL/T3 | 2.660 | 2.959 | 3.123 | 2.813 | 2.958 |
| TTL/T1 | 6.497 | 5.446 | 4.652 | 3.864 | 3.417 |
| AAG/BFL | 0.698 | 0.702 | 1.193 | 0.702 | 2.913 |
| (AAG+EFL)/ALT | 1.796 | 1.563 | 1.643 | 1.654 | 1.090 |
| ALT/Gavg | 8.132 | 7.664 | 6.500 | 9.747 | 11.913 |
| (G12+T3)/G23 | 3.363 | 5.180 | 3.100 | 3.102 | 4.527 |
| (T1+G12+T2)/T3 | 1.310 | 1.698 | 1.700 | 1.452 | 1.700 |
| (G23+BFL)/T1 | 2.098 | 1.611 | 1.293 | 1.153 | 0.445 |
| TL/BFL | 3.536 | 3.392 | 5.069 | 4.123 | 20.262 |
| TTL/AAG | 6.499 | 6.257 | 5.088 | 7.298 | 7.300 |
| ALT/T2 | 3.502 | 3.649 | 4.087 | 5.437 | 4.056 |
| (T1+T2)/G23 | 3.246 | 5.161 | 3.281 | 3.699 | 5.944 |
| (G12+EFL)/T3 | 3.484 | 3.407 | 3.500 | 3.498 | 2.503 |
| TL/(T1+G12) | 3.796 | 2.805 | 2.800 | 2.750 | 2.750 |
| TL/EFL | 0.804 | 0.968 | 0.980 | 0.832 | 1.266 |
| (AAG+BFL)/Tavg | 1.795 | 1.898 | 1.697 | 1.492 | 0.677 |

FIG. 28

OPTICAL LENS ASSEMBLY

CROSS-REFERENCE TO RELATED APPLICATION

This application claims the priority benefit of China application serial no. 202011013664.3, filed on Sep. 24, 2020. The entirety of the above-mentioned patent application is hereby incorporated by reference herein and made a part of this specification.

BACKGROUND

Technical Field

The disclosure relates to an optical lens assembly.

Description of Related Art

In recent years, the applications of portable electronic products have become more and more diversified. In addition to image and video recording, applications that utilize 3D sensing technologies to recognize human faces or objects are also increasing gradually.

There are two main 3D sensing technologies. One is to use a light source to emit infrared light, which irradiates an object through an optical lens assembly and is reflected by the surface of the object, and calculate the distances (depths) to different positions according to the times of reflection from positions at different depths; and the other is to use a light source to form a pattern of a specific form through an optical lens assembly and infer the three-dimensional structure from the distortion of the light pattern caused by reflection from positions at different object depths. In order that the projected light can be clearly recognized, the resolution is particularly important, and it is also required to meet the requirement of compactness for portable electronic devices. Therefore, how to design a small optical lens assembly having good optical quality is an issue worthy of research.

SUMMARY

The disclosure provides a compact and low-cost optical lens assembly having excellent optical quality.

An embodiment of the disclosure provides an optical lens assembly, which includes a first lens element, a second lens element and a third lens element in order from a light exit side to a light incident side along an optical axis. Each of the first lens element to the third lens element includes a light exit surface facing the light exit side and a light incident surface facing the light incident side. A periphery region of the light incident surface of the first lens element is concave. The second lens element has positive refracting power, and an optical axis region of the light incident surface of the second lens element is concave. A periphery region of the light exit surface of the third lens element is concave, and an optical axis region of the light incident surface of the third lens element is convex. The lens elements of the optical lens assembly only include the first lens element to the third lens element, and a thickness of the first lens element along the optical axis is greater than or equal to a sum of two air gaps from the first lens element to the third lens element along the optical axis.

An embodiment of the disclosure provides an optical lens assembly, which includes a first lens element, a second lens element and a third lens element in order from a light exit side to a light incident side along an optical axis. Each of the first lens element to the third lens element includes a light exit surface facing the light exit side and a light incident surface facing the light incident side. A periphery region of the light incident surface of the first lens element is concave. The second lens element has positive refracting power, a periphery region of the light exit surface of the second lens element is convex, and an optical axis region of the light incident surface of the second lens element is concave. A periphery region of the light exit surface of the third lens element is concave. The lens elements of the optical lens assembly only include the first lens element to the third lens element, and a thickness of the first lens element along the optical axis is greater than or equal to a sum of two air gaps from the first lens element to the third lens element along the optical axis.

An embodiment of the disclosure provides an optical lens assembly, which includes a first lens element, a second lens element and a third lens element in order from a light exit side to a light incident side along an optical axis. Each of the first lens element to the third lens element includes a light exit surface facing the light exit side and a light incident surface facing the light incident side. The first lens element has positive refracting power, and a periphery region of the light incident surface of the first lens element is concave. A periphery region of the light exit surface of the second lens element is convex. An optical axis region of the light exit surface of the third lens element is convex, and an optical axis region of the light incident surface of the third lens element is convex. The lens elements of the optical lens assembly only include the first lens element to the third lens element, and the optical lens assembly satisfies the following condition: EFL/BFL≥3.500, wherein EFL is an effective focal length of the optical lens assembly, and BFL is a distance from the light incident surface of the third lens element to a light-emitting surface along the optical axis.

Based on the above, the beneficial effects of the optical lens assembly according to the embodiments of the disclosure are that: by satisfying the concave-convex surface design of the lens elements, the refracting power conditions, and the design of the conditions, the optical lens assembly can provide compact and low-cost lenses with good optical quality even when the overall length is shortened.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 7 is a schematic view illustrating an optical lens assembly according to a first embodiment of the disclosure.

FIG. 8A to FIG. 8D are diagrams illustrating longitudinal spherical aberration and other aberrations of the optical lens assembly according to the first embodiment of the disclosure.

FIG. 9 shows detailed optical data pertaining to the optical lens assembly according to the first embodiment of the disclosure.

FIG. 10 shows aspheric parameters pertaining to the optical lens assembly according to the first embodiment of the disclosure.

FIG. 13 shows detailed optical data pertaining to the optical lens assembly according to the second embodiment of the disclosure.

FIG. 14 shows aspheric parameters pertaining to the optical lens assembly according to the second embodiment of the disclosure.

FIG. 15 is a schematic view illustrating an optical lens assembly according to a third embodiment of the disclosure.

FIG. 16A to FIG. 16D are diagrams illustrating longitudinal spherical aberration and other aberrations of the optical lens assembly according to the third embodiment of the disclosure.

FIG. 17 shows detailed optical data pertaining to the optical lens assembly according to the third embodiment of the disclosure.

FIG. 18 shows aspheric parameters pertaining to the optical lens assembly according to the third embodiment of the disclosure.

FIG. 21 shows detailed optical data pertaining to the optical lens assembly according to the fourth embodiment of the disclosure.

FIG. 22 shows aspheric parameters pertaining to the optical lens assembly according to the fourth embodiment of the disclosure.

FIG. 25 shows detailed optical data pertaining to the optical lens assembly according to the fifth embodiment of the disclosure.

FIG. 26 shows aspheric parameters pertaining to the optical lens assembly according to the fifth embodiment of the disclosure.

FIG. 27 and FIG. 28 show important parameters and relation values thereof pertaining to the optical lens assemblies according to the first through the fifth embodiments of the disclosure.

DETAILED DESCRIPTION OF DISCLOSED EMBODIMENTS

Figure 1A:
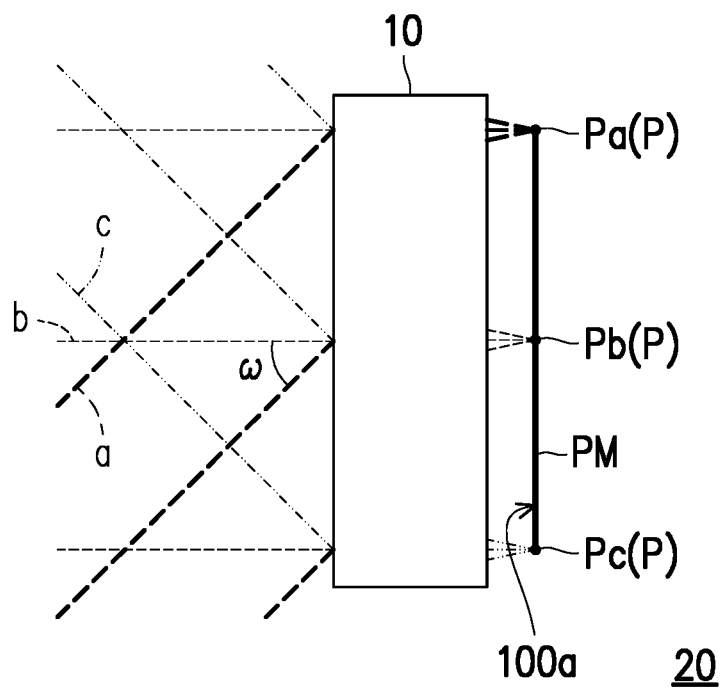
FIG. 1A is a schematic view illustrating an optical lens assembly of the disclosure applied in a 3D sensing transmitter lens.

Referring to FIG. 1A in which ray directions of a three-dimensional (3D) sensing transmitter lens 20 are illustrated, a plurality of near infrared light beams are emitted by a multiple-light source generating unit PM, and the multiple-light source generating unit PM may be a structured light. A plurality of light beams a, b and c are generated by an optical lens assembly 10 according to an embodiment of the disclosure to detect an object or a face in front of the lens. Here, the exit angle is, for example, within a range of −ω degrees to ω degrees, and ω is the maximum half light exit angle of the optical lens assembly 10. The types of the light beams a, b and c are not particularly limited. The travelling directions of the light beams are illustrated by dotted lines. Also, the number of the light beams a, b and c is not necessarily three and may be other numbers not equal to three and one. In FIG. 1A, the light beams a, b and c are illustrated as an example. Each of the light beams a, b and c has a chief ray and a marginal ray (not shown), and the chief ray and the marginal ray of the light beam a are approximately parallel to each other. Similarly, the chief ray and the marginal ray of the light beam b are also approximately parallel to each other, and the chief ray and the marginal ray of the light beam c are also approximately parallel to each other. In detail, the light beams a, b and c in FIG. 1A are respectively emitted by light sources Pa, Pb and Pc at different positions in FIG. 1B. It is known from FIG. 1A that the lights emitted by the light sources P at different positions are emitted out of the optical lens assembly 10 in parallel after passing through the optical lens assembly 10, but the emitting directions differ depending on the positions. Take FIG. 1A as an example, the light source Pa passes through the optical lens assembly 10 and is then emitted out of the optical lens assembly 10 diagonally to the lower left and in parallel (as shown by the light beam a), the light source Pb at another position passes through the optical lens assembly 10 and is then emitted out of the optical lens assembly 10 to the left and in parallel (as shown by the light beam b), and the light source Pc at another position passes through the optical lens assembly 10 and is then emitted out of the optical lens assembly 10 diagonally to the upper left and in parallel (as shown by the light beam c).

Figure 1B:
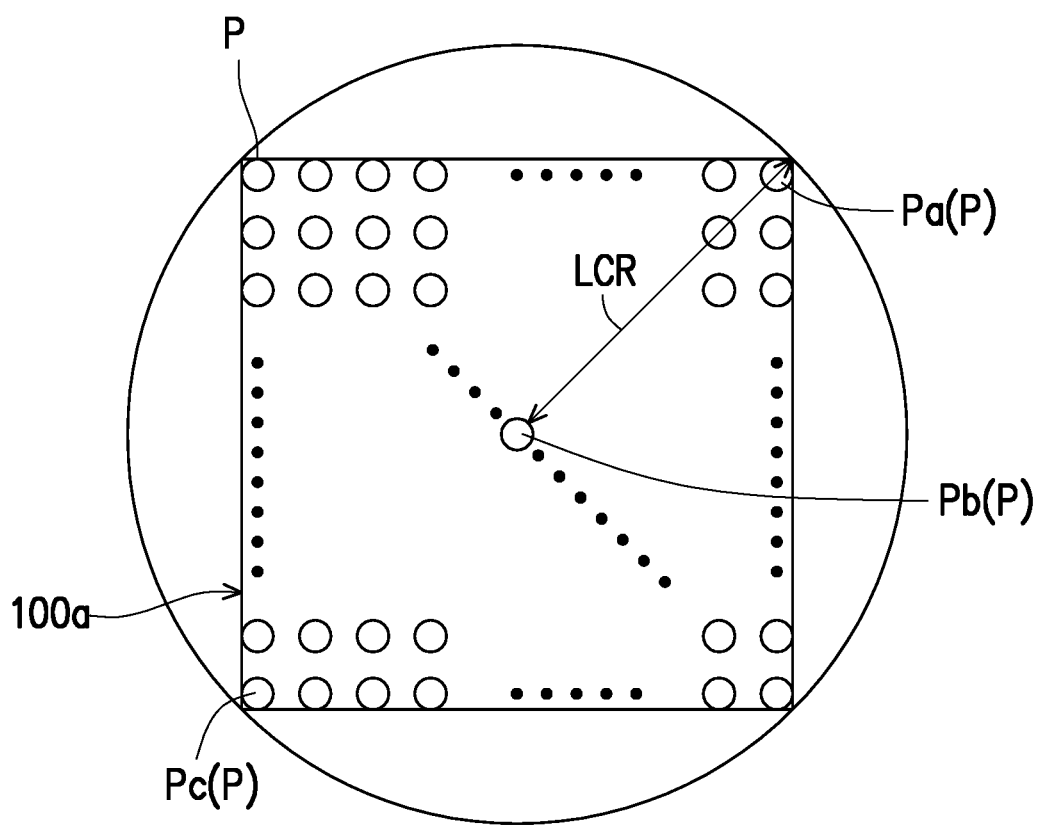
FIG. 1B is a front view of an embodiment of a structured light generating unit having a plurality of light sources in FIG. 1A.

Referring to FIG. 1B, in an embodiment, the multiple-light source generating unit PM includes a plurality of near infrared light beam light sources P arranged in an array. In other embodiments, the near infrared light beam light sources P may also be arranged in a ring arrangement or other arrangements, which are not particularly limited in the disclosure. The near infrared light beam light sources P may be infrared laser light sources. The light-emitting surfaces of the near infrared light beam light sources P form a light-emitting surface 100a of the multiple-light source generating unit PM.

The following criteria for determining optical specifications in the embodiments of the disclosure are based on an assumption that a reverse tracking of the ray direction is a parallel imaging ray passing through the optical lens assembly 10 from a light exit side and focusing on the light-emitting surface 100a of the multiple-light source generating unit PM.

The terms "optical axis region", "periphery region", "concave", and "convex" used in this specification and claims should be interpreted based on the definition listed in the specification by the principle of lexicographer.

Figure 2:
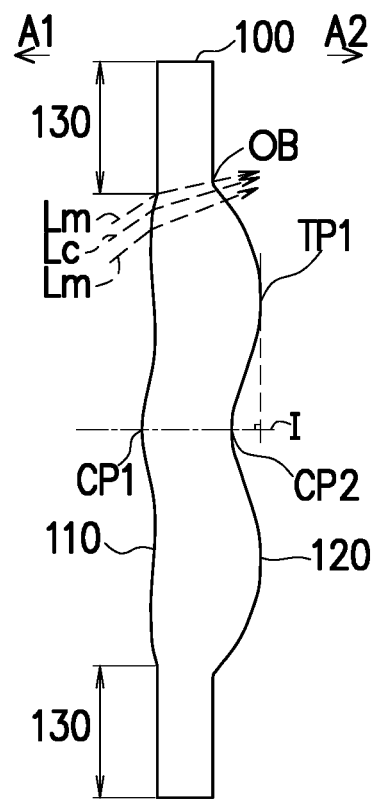
FIG. 2 is a schematic view illustrating a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "a light exit (or light incident) surface of a lens element" refers to a specific region of that surface of the lens element at which imaging rays can pass through that specific region. Imaging rays include at least two types of rays: a chief ray Lc and a marginal ray Lm (as shown in FIG. 2). A light exit (or light incident) surface of a lens element can be characterized as having several regions, including an optical axis region, a periphery region, and, in some cases, one or more intermediate regions, as discussed more fully below.

Figure 5:
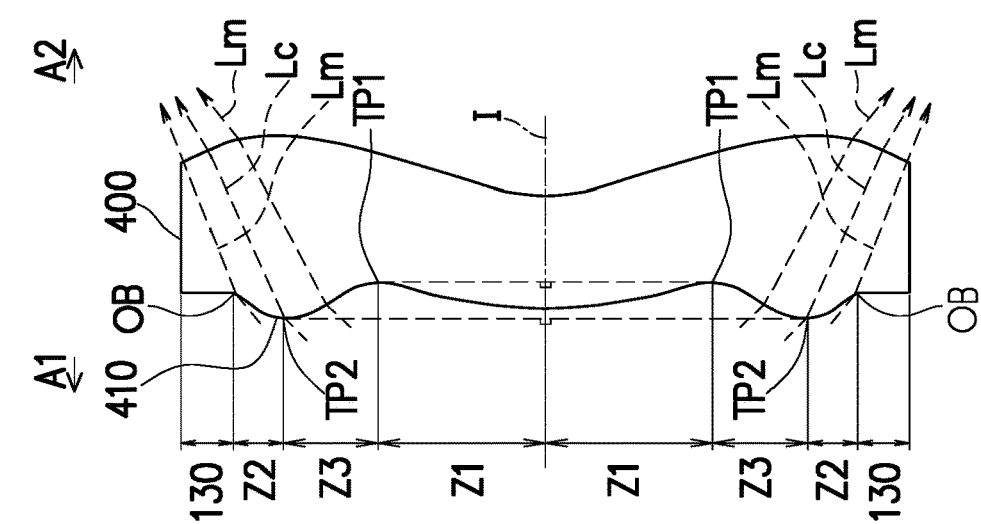
FIG. 5 is a schematic view illustrating a surface structure of a lens element according to an Example 2.

FIG. 2 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 2, a first central point CP1 may be present on the light exit surface 110 of lens element 100 and a second central point CP2 may be present on the light incident surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 5), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the light incident A2 of the lens element. The shape of a region is concave if the extension line of a collimated ray being parallel to the optical axis I and passing through the region intersects the optical axis I on the light exit A1 of the lens element.

Additionally, referring to FIG. 2, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 3:
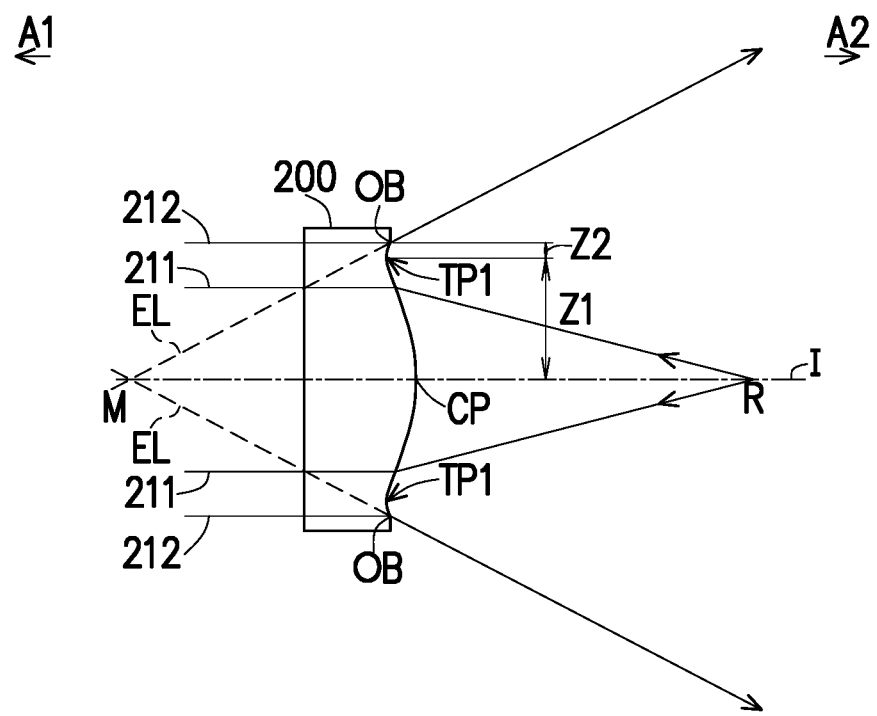
FIG. 3 is a schematic view illustrating a concave and convex surface structure of a lens element and a ray focal point.

Referring to FIG. 3, optical axis region Z1 is defined between central point CP and first transition point TP1. Periphery region Z2 is defined between TP1 and the optical boundary OB of the surface of the lens element. Collimated ray 211 intersects the optical axis I on the light incident A2 of lens element 200 after passing through optical axis region Z1, i.e., the focal point of collimated ray 211 after passing through optical axis region Z1 is on the light incident A2 of the lens element 200 at point R in FIG. 3. Accordingly, since the ray itself intersects the optical axis I on the light incident A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the light exit A1 of lens element 200, i.e., the focal point of collimated ray 212 after passing through periphery region Z2 is on the light exit A1 at point M in FIG. 3. Accordingly, since the extension line EL of the ray intersects the optical axis I on the light exit A1 of the lens element 200, periphery region Z2 is concave. In the lens element 200 illustrated in FIG. 3, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For a light exit surface, a positive R value defines that the optical axis region of the light exit surface is convex, and a negative R value defines that the optical axis region of the light exit surface is concave. Conversely, for a light incident surface, a positive R value defines that the optical axis region of the light incident surface is concave, and a negative R value defines that the optical axis region of the light incident surface is convex. The result found by using this method should be consistent with the method utilizing intersection of the optical axis by rays/extension lines mentioned above, which determines surface shape by referring to whether the focal point of a collimated ray being parallel to the optical axis I is on the light exit or the light incident of a lens element. As used herein, the terms "a shape of a region is convex (concave)," "a region is convex (concave)," and "a convex- (concave-) region," can be used alternatively.

Figure 6:
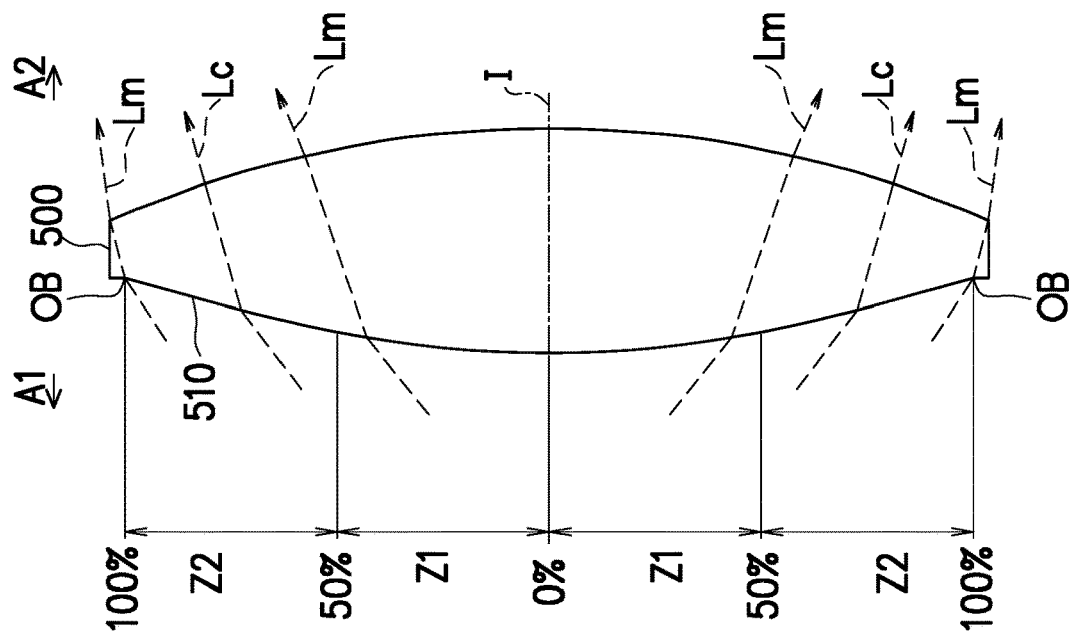
FIG. 6 is a schematic view illustrating a surface structure of a lens element according to an Example 3.
Figure 4:
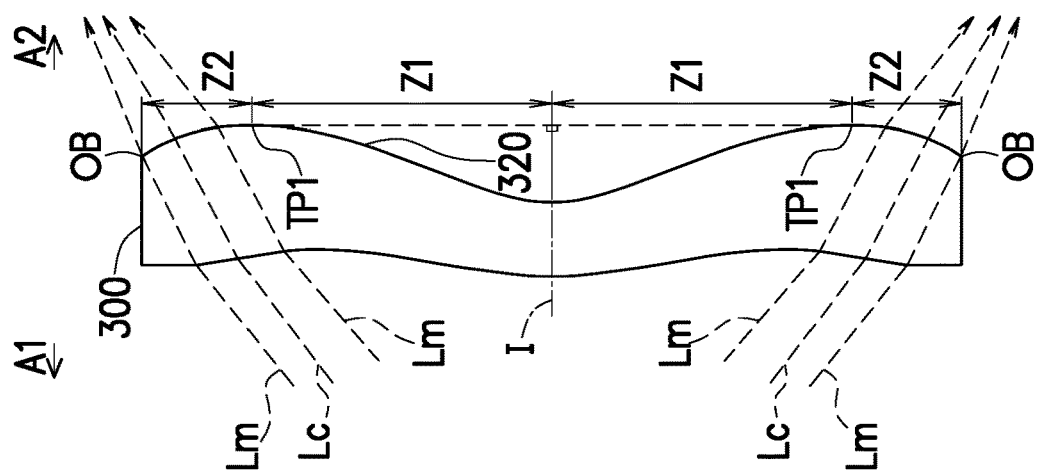
FIG. 4 is a schematic view illustrating a surface structure of a lens element according to an Example 1.

FIG. 4, FIG. 5 and FIG. 6 illustrate examples of determining the shape of lens element regions and the boundaries of regions under various circumstances, including the optical axis region, the periphery region, and intermediate regions as set forth in the present specification.

FIG. 4 is a radial cross-sectional view of a lens element 300. As illustrated in FIG. 4, only one transition point TP1 appears within the optical boundary OB of the light incident surface 320 of the lens element 300. Optical axis region Z1 and periphery region Z2 of the light incident surface 320 of lens element 300 are illustrated. The R value of the light incident surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 4, since the shape of the optical axis region Z1 is concave, the shape of the periphery region Z2 will be convex as the shape changes at the transition point TP1.

FIG. 5 is a radial cross-sectional view of a lens element 400. Referring to FIG. 5, a first transition point TP1 and a second transition point TP2 are present on the light exit surface 410 of lens element 400. The optical axis region Z1 of the light exit surface 410 is defined between the optical axis I and the first transition point TP1. The R value of the light exit surface 410 is positive (i.e., R>0). Accordingly, the optical axis region Z1 is convex.

The periphery region Z2 of the light exit surface 410, which is also convex, is defined between the second transition point TP2 and the optical boundary OB of the light exit surface 410 of the lens element 400. Further, intermediate region Z3 of the light exit surface 410, which is concave, is defined between the first transition point TP1 and the second transition point TP2. Referring once again to FIG. 5, the light exit surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the light exit surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 6 is a radial cross-sectional view of a lens element 500. Lens element 500 has no transition point on the light exit surface 510 of the lens element 500. For a surface of a lens element with no transition point, for example, the light exit surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 6, the optical axis region Z1 of the light exit surface 510 is defined between the optical axis I and 50% of the distance between the optical axis I and the optical boundary OB. The R value of the light exit surface 510 is positive (i.e., R>0). Accordingly, the optical axis region Z1 is convex. For the light exit surface 510 of the lens element 500, because there is no transition point, the periphery region Z2 of the light exit surface 510 is also convex. It should be noted that lens element 500 may have a mounting portion (not shown) extending radially outward from the periphery region Z2.

FIG. 7 is a schematic view illustrating an optical lens assembly according to a first embodiment of the disclosure. FIG. 8A to FIG. 8D are diagrams illustrating longitudinal spherical aberration and other aberrations of the optical lens assembly according to the first embodiment of the disclosure. Referring to FIG. 7, the optical lens assembly 10 according to the first embodiment of the disclosure includes a first protection glass 8, an aperture stop 0, second protection glass 9, a first lens element 1, a second lens element 2 and a third lens element 3 arranged along an optical axis I of the optical lens assembly 10 in the order from the light exit side to the light incident side. When a plurality of near infrared lights are emitted by the light-emitting surface 100a of the multiple-light source generating unit PM and enter the optical lens assembly 10, after the plurality of near infrared lights pass through the third lens element 3, the second lens element 2, the first lens element 1, the second protection glass 9, the aperture stop 0 and the first protection glass 8 in order, a plurality of light beams are generated and emitted out of the optical lens assembly 10. It should be pointed out that the light incident side is a side facing the multiple-light source generating unit PM, and the other side opposite thereto is the light exit side A1.

In the embodiment, in order that the optical lens assembly 10 of the embodiment of the disclosure maintains a certain optical quality in different environments, the first protection glass 8 and the second protection glass 9 are sequentially arranged from the light exit side A1 to the light incident side A2. Furthermore, in order to improve the optical quality of the optical lens assembly 10, a glue compound with the same refractive index as the first protection glass 8 and the second protection glass 9 is arranged between the first protection glass 8 and the second protection glass 9. In addition, the first lens element 1 to the third lens element 3 are all made of a plastic material, but the material of the first lens element 1 to the third lens element 3 is not limited thereto.

In the embodiment, each of the first protection glass 8, the second protection glass 9, the first lens element 1, the second lens element 2, and the third lens element 3 of the optical lens assembly 10 has a light exit surface 81, 91, 11, 21, or 31 which faces the light exit side A1 and allows the plurality of near infrared lights to pass through, and a light incident surface 82, 92, 12, 22, or 32 which faces the light incident side A2 and allows the plurality of near infrared lights to pass through.

The first lens element 1 has positive refracting power. The optical axis region 111 of the light exit surface 11 of the first lens element 1 is convex, and the periphery region 112 thereof is convex. The optical axis region 121 of the light incident surface 12 of the first lens element 1 is concave, and the periphery region 122 thereof is concave. In the embodiment, both the light exit surface 11 and the light incident surface 12 of the first lens element 1 are aspheric surfaces, but the disclosure is not limited thereto.

The second lens element 2 has positive refracting power. The optical axis region 211 of the light exit surface 21 of the second lens element 2 is convex, and the periphery region 212 thereof is convex. The optical axis region 221 of the light incident surface 22 of the second lens element 2 is concave, and the periphery region 222 thereof is concave. In the embodiment, both the light exit surface 21 and the light incident surface 22 of the second lens element 2 are aspheric surfaces, but the disclosure is not limited thereto.

The third lens element 3 has positive refracting power. The optical axis region 311 of the light exit surface 31 of the third lens element 3 is convex, and the periphery region 312 thereof is concave. The optical axis region 321 of the light incident surface 32 of the third lens element 3 is convex, and the periphery region 322 thereof is convex. In the embodiment, both the light exit surface 31 and the light incident surface 32 of the third lens element 3 are aspheric surfaces, but the disclosure is not limited thereto.

Other detailed optical data of the first embodiment is as shown in FIG. 9, and the effective focal length (EFL) of the optical lens assembly 10 of the first embodiment is 2.787 millimeters (mm), the half field of view (HFOV) is 9.837 degrees, the distance DL is 3.295 mm, the aperture value (F-number, Fno) is 2.342, and the light circle radius (LCR) is 0.500 mm, wherein the distance DL refers to a distance from the light exit surface 81 of the first protection glass 8 to the light-emitting surface 100a along the optical axis I. The "Fno" referred to in this specification is an aperture value calculated based on the principle of light reversibility and the effective aperture of the light beam emitted by the optical lens assembly 10, that is, the aperture stop 0 is considered as a pupil of incident light.

In the embodiment, the lens elements of the optical lens assembly 10 only include the first lens element 1 to the third lens element 3 mentioned above.

Moreover, in the embodiment, a total of six surfaces including the light exit surfaces 11, 21 and 31 as well as the light incident surfaces 12, 22 and 32 of the first lens element 1, the second lens element 2 and the third lens element 3 are aspheric surfaces, and the light exit surfaces 11, 21, and 31 and the light incident surfaces 12, 22, and 32 are general even aspheric surfaces. The aspheric surfaces are defined by the following equation:

$$Z(Y) = \frac{Y^2}{R} \left/ \left(1 + \sqrt{1-(1+K)\frac{Y^2}{R^2}}\right) + \sum_{i=1}^{n} a_i \times Y^i \right. \quad (1)$$

wherein,
Y: a distance from a point on an aspheric curve to the optical axis I;
Z: a depth of the aspheric surface (i.e. a perpendicular distance between the point on the aspheric surface that is spaced by the distance Y from the optical axis I and a tangent plane tangent to a vertex of the aspheric surface along the optical axis I);
R: a radius of curvature of the surface of the lens element near the optical axis I;
K: a conic constant;
$a_i$: the $i^{th}$ aspheric coefficient.

Each aspheric coefficient from the light exit surface 11 of the first lens element 1 to the light incident surface 32 of the third lens element 3 in the equation (1) is indicated in FIG. 10. In FIG. 10, the reference number 11 is one column that represents the aspheric coefficient of the light exit surface 11 of the first lens element 1, and the reference numbers in other columns can be deduced from the above. In the embodiment and the following embodiments, the conic constant K is 0, and the second aspheric coefficient $a_2$ is 0.

Additionally, the relationship among the important parameters pertaining to the optical lens assembly 10 of the first embodiment is indicated in FIG. 27.

wherein,
CG1 represents the thickness of the first protection glass 8 along the optical axis I;
CG2 represents the thickness of the second protection glass 9 along the optical axis I;
T1 represents the thickness of the first lens element 1 along the optical axis I;
T2 represents the thickness of the second lens element 2 along the optical axis I;
T3 represents the thickness of the third lens element 3 along the optical axis I;
CG12 represents the distance from the light incident surface 82 of the first protection glass 8 to the light exit surface 91 of the second protection glass 9 along the optical axis I;
CG21 represents the distance from the light incident surface 92 of the second protection glass 9 to the light exit surface 11 of the first lens element 1 along the optical axis I;
G12 represents an air gap between the first lens element 1 and the second lens element 2 along the optical axis I;
G23 represents an air gap between the second lens element 2 and the third lens element 3 along the optical axis I;
AAG represents a sum of the two air gaps from the first lens element 1 to the third lens element 3 along the optical axis I, i.e. the sum of G12 and G23;
ALT represents a sum of the thicknesses of the three lens elements from the first lens element 1 to the third lens element 3 along the optical axis I, i.e. the sum of T1, T2 and T3;
TL represents the distance from the light exit surface 11 of the first lens element 1 to the light incident surface 32 of the third lens element 3 along the optical axis I;
TTL represents the distance from the light exit surface 11 of the first lens element 1 to the light-emitting surface 100a along the optical axis I;
DL represents the distance from the optical element closest to the light exit side A1 to the light-emitting surface 100a along the optical axis I;
BFL represents the distance from the light incident surface 32 of the third lens element 3 to the light-emitting surface 100a along the optical axis I;
HFOV represents the half field of view of the optical lens assembly 10, which is the maximum half light exit angle co of the optical lens assembly 10 based on the principle of light reversibility;
EFL represents the effective focal length of the optical lens assembly 10;
LCR represents the light circle radius (marked as LCR as shown in FIG. 1B), which is the radius of the minimum circumscribed circle of the light-emitting surface 100a of the multiple-light source generating unit PM;
Fno represents the aperture value of the optical lens assembly 10, which is calculated based on the principle of light reversibility and clear aperture of the light beam emitted by the optical lens assembly 10, and in the embodiment of the disclosure the aperture stop 0 is considered as a pupil of incident light;
Tavg represents the average value of the lens thicknesses of all the lens elements along the optical axis I;
Gavg represents the average value of the air gaps from the first lens element 1 to the third lens element 3 along the optical axis I;
in addition, it is further defined that:
f1 is the focal length of the first lens element 1;
f2 is the focal length of the second lens element 2;
f3 is the focal length of the third lens element 3;
n1 is the refractive index of the first lens element 1;
n2 is the refractive index of the second lens element 2;
n3 is the refractive index of the third lens element 3;
V1 is the Abbe number of first lens element 1, and the Abbe number may also be called a dispersion coefficient;
V2 is the Abbe number of the second lens element 2; and
V3 is the Abbe number of the third lens element 3.

In FIG. 27, the unit of the value of each parameter is millimeter (mm).

With reference to FIG. 8A to FIG. 8D, FIG. 8A is a diagram describing the longitudinal spherical aberration on the light-emitting surface 100a of the first embodiment in the condition that the wavelength is 934 nm, 940 nm and 946 nm, and FIG. 8B and FIG. 8C are diagrams respectively describing the field curvature aberration regarding sagittal direction and field curvature aberration regarding tangential direction of the multiple-light source generating unit PM on the light-emitting surface 100a of the first embodiment in the condition that the wavelength is 934 nm, 940 nm and 946 nm. FIG. 8D is a diagram describing distortion aberration of the multiple-light source generating unit PM on the light-emitting surface 100a of the first embodiment in the condition that the wavelength is 934 nm, 940 nm and 946 nm. As shown in FIG. 8A, the curve of each wavelength is close to one another and near the middle position, which shows that the off-axis ray of each wavelength at different heights is focused near the imaging point. The skew margin of the curve of each wavelength shows that the imaging point deviation of the off-axis ray at different heights is controlled within a range of −5 μm to 25 μm. Accordingly, it is evident that the embodiment can significantly improve the spherical aberration of the same wavelength. In addition, the distances between the three representative wavelengths are close to one another, which represents that the imaging positions of the rays with different wavelengths are concentrated. Therefore, the chromatic aberration can be significantly improved.

In FIG. 8B and FIG. 8C which illustrate two diagrams of field curvature aberration, the focal length variation of the three representative wavelengths in the entire field of view falls within a range of −5 μm to 25 μm, which represents that the optical system in the first embodiment can effectively eliminate aberration. In FIG. 8D, the diagram of distortion aberration shows that the distortion aberration in the first embodiment can be maintained within a range of 0% to 3.5%, which shows that the distortion aberration in the first embodiment can meet the image quality requirement of the optical system. Based on the above, it is shown that the first embodiment can provide better image quality compared with existing optical lens assembly under the condition where the distance DL is shortened to 3.295 mm.

Figure 11:
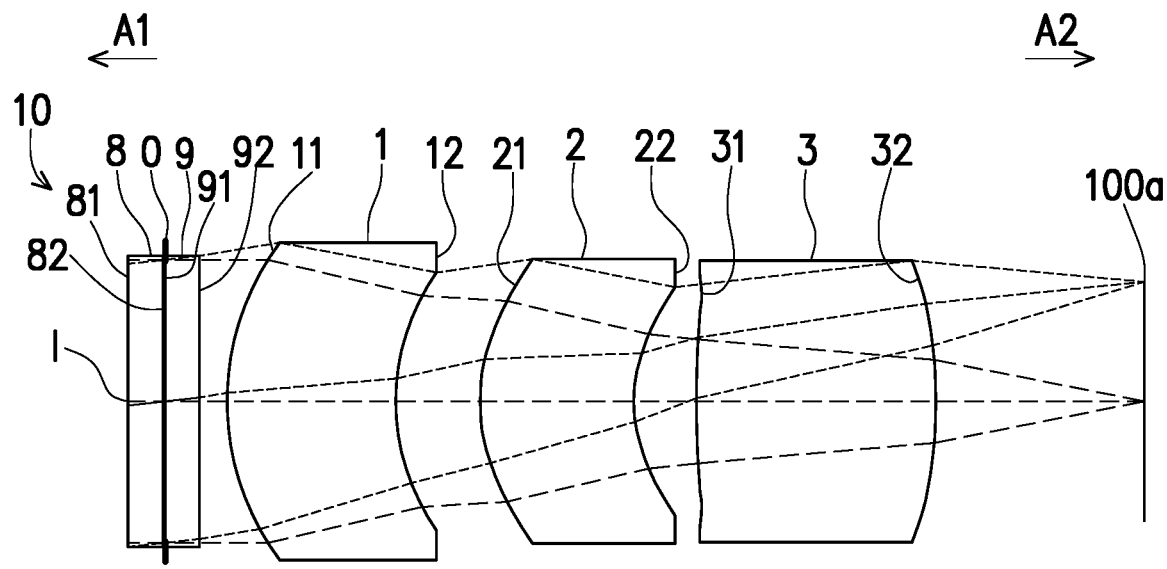
FIG. 11 is a schematic view illustrating an optical lens assembly according to a second embodiment of the disclosure.

FIG. 11 is a schematic view illustrating an optical lens assembly according to a second embodiment of the disclosure, and FIG. 12A to FIG. 12D are diagrams illustrating longitudinal spherical aberration and other aberrations of the optical lens assembly according to the second embodiment of the disclosure. Referring to FIG. 11, the second embodiment of the optical lens assembly 10 of the disclosure is similar to the first embodiment, and the difference lies in optical data, aspheric coefficients and the parameters of the lens elements 1, 2 and 3. It should be noted that, in order to show the view clearly, the reference numerals of the optical axis region and the periphery region having similar surface shapes to the first embodiment are omitted in FIG. 11.

The detailed optical data of the optical lens assembly 10 of the second embodiment is as shown in FIG. 13, and the effective focal length of the optical lens assembly 10 of the second embodiment is 3.099 mm, the half field of view (HFOV) is 9.192 degrees, the distance DL is 4.306 mm, the f-number (Fno) is 2.605, and the LCR is 0.500 mm.

FIG. 14 shows each aspheric coefficient pertaining to the light exit surface 11 of the first lens element 1 through the light incident surface 32 of the third lens element 3 in the equation (1) in the second embodiment.

Additionally, the relationship among the important parameters pertaining to the optical lens assembly 10 of the second embodiment is indicated in FIG. 27.

Figures 12A, 12B, 12C, 12D:
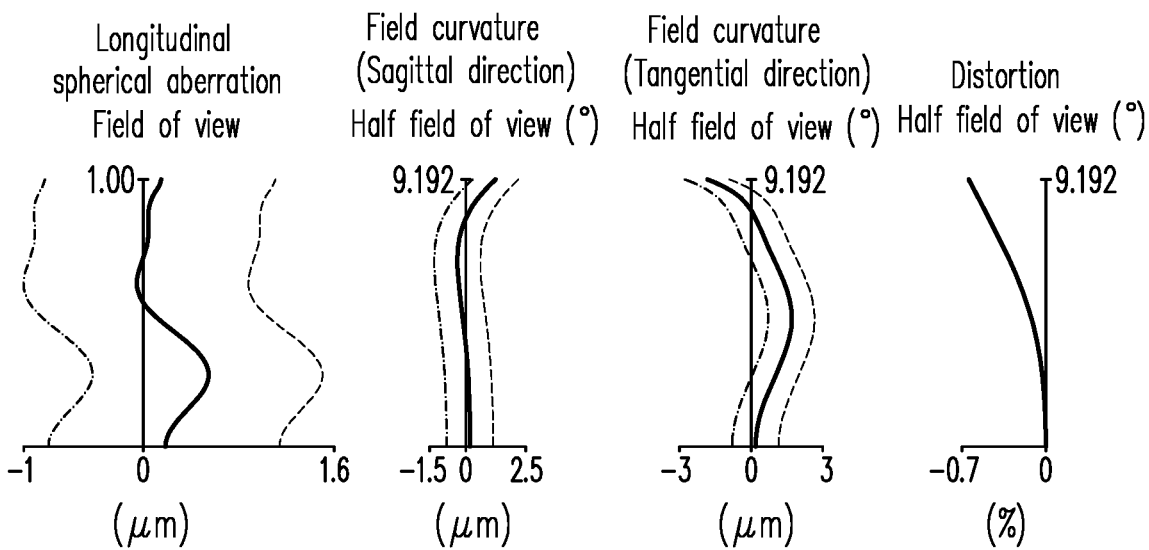
FIG. 12A to FIG. 12D are diagrams illustrating longitudinal spherical aberration and other aberrations of the optical lens assembly according to the second embodiment of the disclosure.

As shown in FIG. 12A, the imaging point deviation of the off-axis ray at different heights is controlled within a range of −1 μm to 1.6 μm. In FIG. 12B and FIG. 12C which illustrate two diagrams of field curvature aberration, the focal length variation of the three representative wavelengths in the entire field of view falls within a range of −3 μm to 3 μm. In FIG. 12D, the diagram of distortion aberration shows that the distortion aberration in the second embodiment can be maintained within a range of −0.7% to 0%. Based on the above, it is shown that the second embodiment can provide better image quality compared with existing optical lens assembly under the condition where the distance DL is shortened to 4.306 mm.

The above descriptions show that the advantage of the second embodiment relative to the first embodiment is that the longitudinal spherical aberration, field curvature aberration or distortion aberration in the second embodiment is better than that in the first embodiment.

FIG. 15 is a schematic view illustrating an optical lens assembly according to a third embodiment of the disclosure, and FIG. 16A to FIG. 16D are diagrams illustrating longitudinal spherical aberration and other aberrations of the optical lens assembly according to the third embodiment of the disclosure. Referring to FIG. 15, the third embodiment of the optical lens assembly 10 of the disclosure is similar to the first embodiment, and the difference lies in optical data, aspheric coefficients and the parameters of the lens elements 1, 2 and 3. It should be noted that, in order to show the view clearly, the reference numerals of the optical axis region and the periphery region having similar surface shapes to the first embodiment are omitted in FIG. 15.

The detailed optical data of the optical lens assembly 10 of the third embodiment is as shown in FIG. 17, and the effective focal length of the optical lens assembly 10 of the third embodiment is 2.391 mm, the half field of view (HFOV) is 12.158 degrees, the distance DL is 3.224 mm, the f-number (Fno) is 2.009, and the LCR is 0.500 mm.

FIG. 18 shows each aspheric coefficient pertaining to the light exit surface 11 of the first lens element 1 through the light incident surface 32 of the third lens element 3 in the equation (1) in the third embodiment.

Additionally, the relationship among the important parameters pertaining to the optical lens assembly 10 of the third embodiment is indicated in FIG. 27.

As shown in FIG. 16A, the imaging point deviation of the off-axis ray at different heights is controlled within a range of −1 μm to 1.2 μm. In FIG. 16B and FIG. 16C which illustrate two diagrams of field curvature aberration, the focal length variation of the three representative wavelengths in the entire field of view falls within a range of −4.5 μm to 1.5 μm. In FIG. 16D, the diagram of distortion aberration shows that the distortion aberration in the third embodiment can be maintained within a range of −3.5% to 0%. Based on the above, it is shown that the third embodiment can provide better image quality compared with existing optical lens assembly under the condition where the distance DL is shortened to 3.224 mm.

The above descriptions show that the advantage of the third embodiment relative to the first embodiment is that the distance DL in the third embodiment is shorter than that in the first embodiment, and the longitudinal spherical aberration or field curvature aberration in the third embodiment is better than that in the first embodiment.

Figure 19:
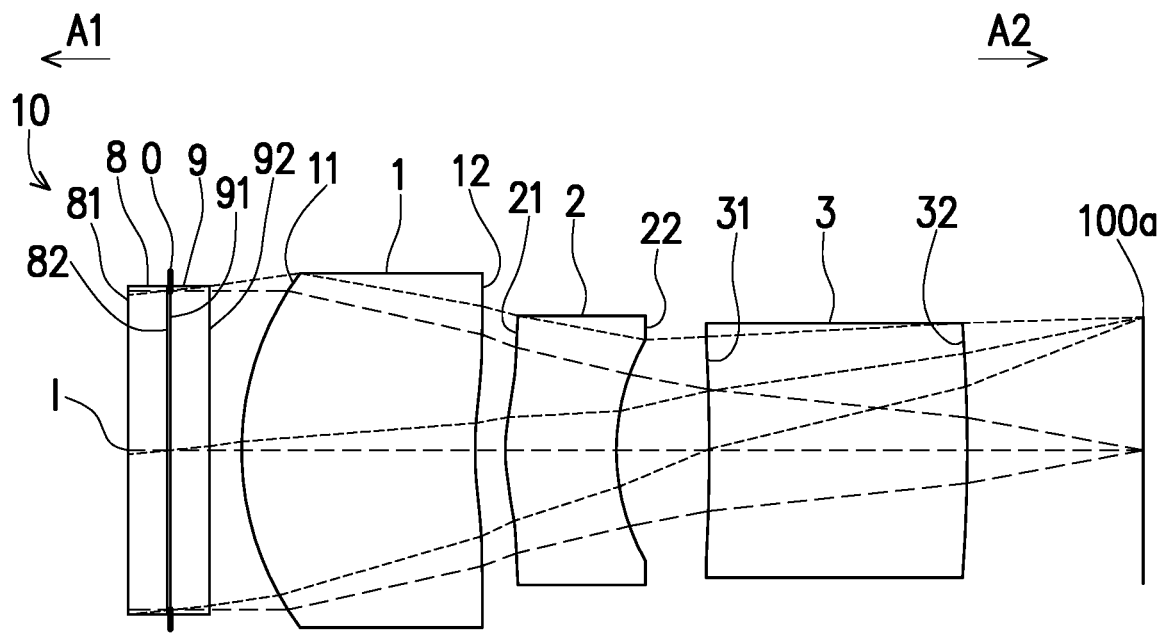
FIG. 19 is a schematic view illustrating an optical lens assembly according to a fourth embodiment of the disclosure.

FIG. 19 is a schematic view illustrating an optical lens assembly according to a fourth embodiment of the disclosure, and FIG. 20A to FIG. 20D are diagrams illustrating longitudinal spherical aberration and other aberrations of the optical lens assembly according to the fourth embodiment of the disclosure. Referring to FIG. 19, the fourth embodiment of the optical lens assembly 10 of the disclosure is similar to the first embodiment, and the difference lies in optical data, aspheric coefficients and the parameters of the lens elements 1, 2 and 3. It should be noted that, in order to show the view clearly, the reference numerals of the optical axis region and the periphery region having similar surface shapes to the first embodiment are omitted in FIG. 19.

The detailed optical data of the optical lens assembly 10 of the fourth embodiment is as shown in FIG. 21, and the effective focal length of the optical lens assembly 10 of the fourth embodiment is 3.293 mm, the half field of view (HFOV) is 8.609 degrees, the distance DL is 3.769 mm, the f-number (Fno) is 2.700, and the LCR is 0.500 mm.

FIG. 22 shows each aspheric coefficient pertaining to the light exit surface 11 of the first lens element 1 through the light incident surface 32 of the third lens element 3 in the equation (1) in the fourth embodiment.

Additionally, the relationship among the important parameters pertaining to the optical lens assembly 10 of the fourth embodiment is indicated in FIG. 27.

Figures 20A, 20B, 20C, 20D:
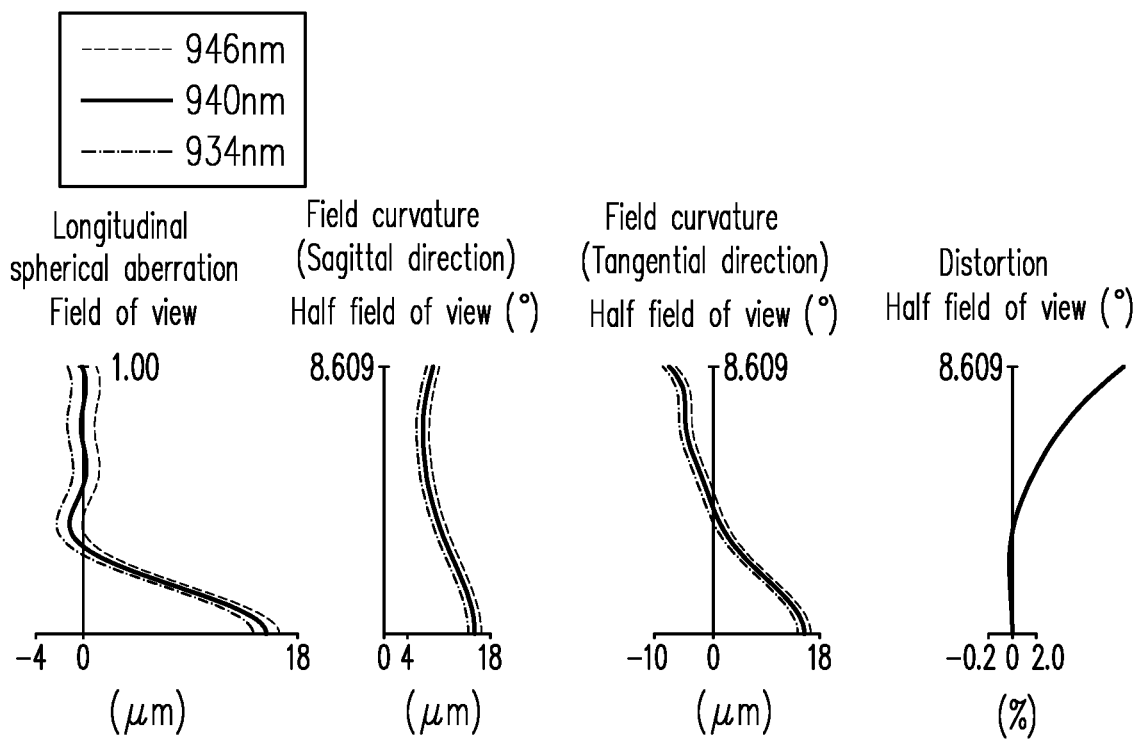
FIG. 20A to FIG. 20D are diagrams illustrating longitudinal spherical aberration and other aberrations of the optical lens assembly according to the fourth embodiment of the disclosure.

As shown in FIG. 20A, the imaging point deviation of the off-axis ray at different heights is controlled within a range of −4 μm to 18 μm. In FIG. 20B and FIG. 20C which illustrate two diagrams of field curvature aberration, the focal length variation of the three representative wavelengths in the entire field of view falls within a range of −10 μm to 18 μm. In FIG. 20D, the diagram of distortion aberration shows that the distortion aberration in the fourth embodiment can be maintained within a range of −0.2% to 2.0%. Based on the above, it is shown that the fourth embodiment can provide better image quality compared with existing optical lens assembly under the condition where the distance DL is shortened to 3.769 mm.

The above descriptions show that the advantage of the fourth embodiment relative to the first embodiment is that the longitudinal spherical aberration, field curvature aberration or distortion aberration in the fourth embodiment is better than that in the first embodiment, and the thickness difference between the optical axis region and the periphery region of the lens in the fourth embodiment is smaller than that in the first embodiment. In view of the above, the fourth embodiment is easier to be manufactured and has higher yield rate.

Figure 23:
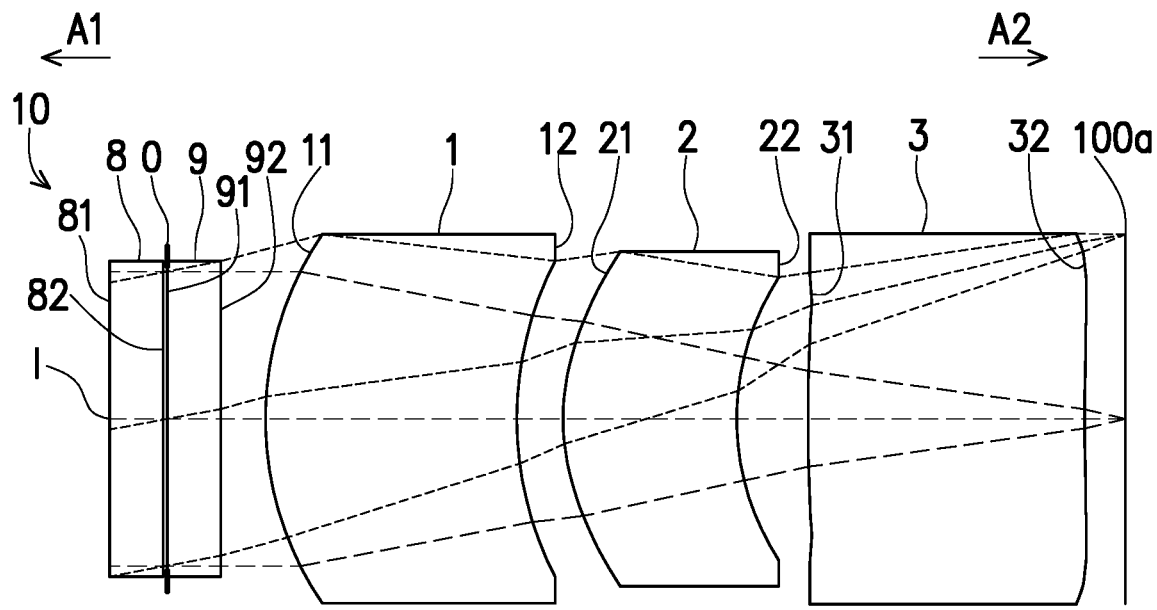
FIG. 23 is a schematic view illustrating an optical lens assembly according to a fifth embodiment of the disclosure.

FIG. 23 is a schematic view illustrating an optical lens assembly according to a fifth embodiment of the disclosure, and FIG. 24A to FIG. 24D are diagrams illustrating longitudinal spherical aberration and other aberrations of the optical lens assembly according to the fifth embodiment of the disclosure. Referring to FIG. 23, the fifth embodiment of the optical lens assembly 10 of the disclosure is similar to the first embodiment, and the difference lies in optical data, aspheric coefficients and the parameters of the lens elements 1, 2 and 3. It should be noted that, in order to show the view clearly, the reference numerals of the optical axis region and the periphery region having similar surface shapes to the first embodiment are omitted in FIG. 23.

The detailed optical data of the optical lens assembly 10 of the fifth embodiment is as shown in FIG. 25, and the effective focal length of the optical lens assembly 10 of the fifth embodiment is 1.752 mm, the half field of view (HFOV) is 15.363 degrees, the distance DL is 2.748 mm, the f-number (Fno) is 2.200, and the LCR is 0.500 mm.

FIG. 26 shows each aspheric coefficient pertaining to the light exit surface 11 of the first lens element 1 through the light incident surface 32 of the third lens element 3 in the equation (1) in the fifth embodiment.

Additionally, the relationship among the important parameters pertaining to the optical lens assembly 10 of the fifth embodiment is indicated in FIG. 27.

Figures 24A, 24B, 24C, 24D:
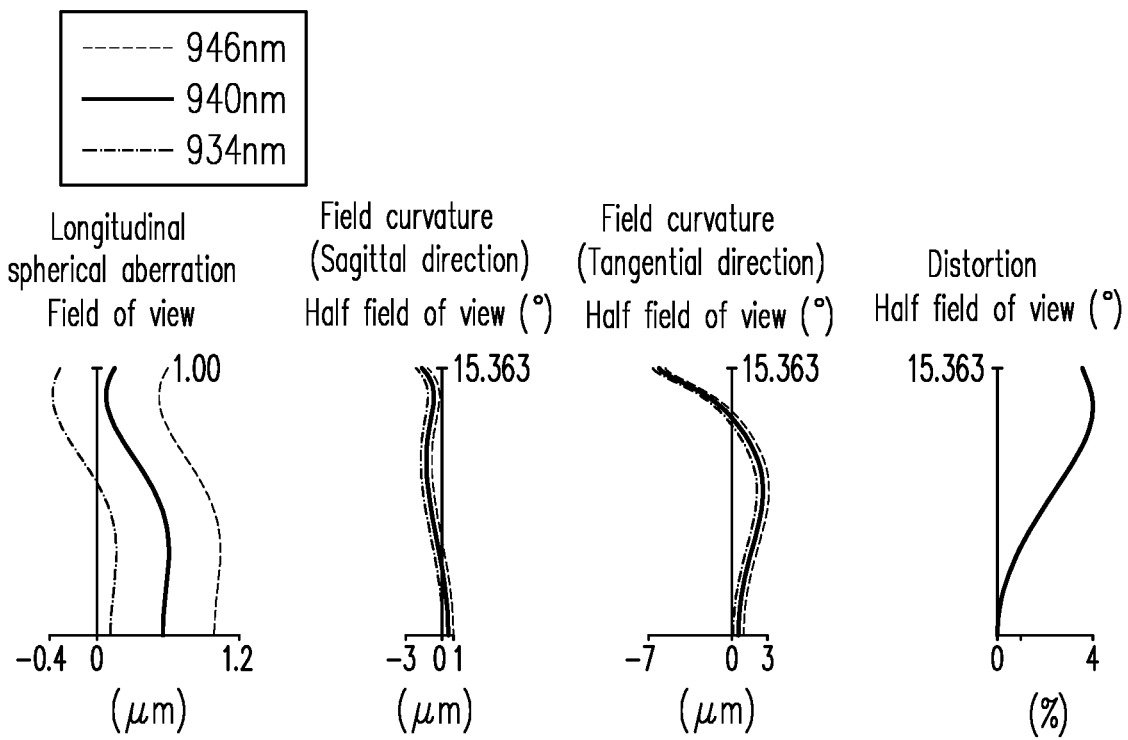
FIG. 24A to FIG. 24D are diagrams illustrating longitudinal spherical aberration and other aberrations of the optical lens assembly according to the fifth embodiment of the disclosure.

As shown in FIG. 24A, the imaging point deviation of the off-axis ray at different heights is controlled within a range of −0.4 μm to 1.2 μm. In FIG. 24B and FIG. 24C which illustrate two diagrams of field curvature aberration, the focal length variation of the three representative wavelengths in the entire field of view falls within a range of −7 μm to 3 μm. In FIG. 24D, the diagram of distortion aberration shows that the distortion aberration in the fifth embodiment can be maintained within a range of 0% to 4%. Based on the above, it is shown that the fifth embodiment can provide better image quality compared with existing optical lens assembly under the condition where the distance DL is shortened to 2.748 mm.

The above descriptions show that the advantage of the fifth embodiment relative to the first embodiment is that the distance DL in the fifth embodiment is shorter than that in the first embodiment, and the longitudinal spherical aberration or field curvature aberration in the fifth embodiment is better than that in the first embodiment.

With reference to FIG. 27 and FIG. 28, FIG. 27 and FIG. 28 provide tables of each optical parameter according to the first embodiment through the fifth embodiment mentioned above.

In order to shorten the overall length of the optical lens assembly 10 of the embodiment of the disclosure and ensure optical quality, it is one of the means of the disclosure to shorten the air gap between lens elements or properly shorten the thickness of the lens in consideration of manufacturing difficulty. If the limitation of numerals as set forth in the conditions below is satisfied, the embodiment of the disclosure achieves a better configuration.

In the optical lens assembly 10 of the embodiment of the disclosure, the following condition is met: TL/EFL≥0.800, wherein the preferred range is 0.800≤TL/EFL≤1.400.

In the optical lens assembly 10 of the embodiment of the disclosure, the following condition is met: AAG/BFL≥0.700, wherein the preferred range is 0.700≤AAG/BFL≤3.200.

In the optical lens assembly 10 of the embodiment of the disclosure, the following condition is met: (AAG+EFL)/ALT≤2.500, wherein the preferred range is 1.000≤(AAG+EFL)/ALT≤2.500.

In the optical lens assembly 10 of the embodiment of the disclosure, the following condition is met: TL/BFL≥3.200, wherein the preferred range is 3.200≤TL/BFL≤22.000.

In the optical lens assembly 10 of the embodiment of the disclosure, the following condition is met: (AAG+BFL)/Tavg≤1.900, wherein the preferred range is 0.600≤(AAG+BFL)/Tavg≤1.900.

In the optical lens assembly 10 of the embodiment of the disclosure, the following condition is met: (G23+BFL)/T1≤2.100, where the preferred range is 0.400≤(G23+BFL)/T1≤2.100.

In the optical lens assembly 10 of the embodiment of the disclosure, the following condition is met: (G12+EFL)/T3≤3.500, wherein the preferred range is 2.300≤(G12+EFL)/T3≤3.500.

In the optical lens assembly 10 of the embodiment of the disclosure, the following condition is met: $(T2+T3)/G23 \leq 6.300$, wherein the preferred range is $3.300 \leq (T2+T3)/G23 \leq 6.300$.

In the optical lens assembly 10 of the embodiment of the disclosure, the following condition is met: $TTL/AAG \leq 7.300$, wherein the preferred range is $4.500 \leq TTL/AAG \leq 7.300$.

In the optical lens assembly 10 of the embodiment of the disclosure, the following condition is met: $TL/T3 \leq 3.300$, wherein the preferred range is $2.400 \leq TL/T3 \leq 3.300$.

In the optical lens assembly 10 of the embodiment of the disclosure, the following condition is met: $ALT/T2 \geq 3.500$, wherein the preferred range is $3.500 \leq ALT/T2 \leq 6.000$.

In the optical lens assembly 10 of the embodiment of the disclosure, the following condition is met: $(T1+G12+T2)/T3 \leq 1.700$, wherein the preferred range is $1.200 \leq (T1+G12+T2)/T3 \leq 1.700$.

In the optical lens assembly 10 of the embodiment of the disclosure, the following condition is met: $(T1+T2)/G23 \leq 6.000$, wherein the preferred range is $2.900 \leq (T1+T2)/G23 \leq 6.000$.

In the optical lens assembly 10 of the embodiment of the disclosure, the following condition is met: $(G12+T3)/G23 \geq 3.100$, wherein the preferred range is $3.100 \leq (G12+T3)/G23 \leq 5.700$.

In the optical lens assembly 10 of the embodiment of the disclosure, the following condition is met: $TTL/T1 \leq 6.500$, wherein the preferred range is $3.100 \leq TTL/T1 \leq 6.500$.

In the optical lens assembly 10 of the embodiment of the disclosure, the following condition is met: $ALT/Gavg \geq 6.500$, wherein the preferred range is $6.500 \leq ALT/Gavg \leq 13.000$.

In the optical lens assembly 10 of the embodiment of the disclosure, the following condition is met: $TL/(T1+G12) \geq 2.750$, wherein the preferred range is $2.750 \leq TL/(T1+G12) \leq 4.200$.

In addition, it is optional to select a random combination relationship of the parameters in the embodiment to increase limitation of the lens for the ease of designing the lens having the same structure in the disclosure. Due to the unpredictability in the design of an optical system, with the framework of the embodiments of the disclosure, under the circumstances where the above-described conditions are satisfied, the optical lens assembly 10 according to the embodiments of the disclosure with smaller size, improved optical quality, or better yield rate can be preferably achieved so as to improve the shortcoming of prior art.

The above-limited relation is provided in an exemplary sense and can be randomly and selectively combined and applied to the embodiments of the disclosure in different manners; the disclosure should not be limited to the above examples. In implementation of the disclosure, apart from the above-described relations, it is also possible to add additional detailed structure such as more concave and convex curvatures arrangement of a specific lens element or a plurality of lens elements so as to enhance control of system property and/or resolution. It should be noted that the above-described details can be optionally combined and applied to the other embodiments of the disclosure under the condition where they are not in conflict with one another.

In summary, the optical lens assembly 10 in the embodiment of the disclosure can achieve the following effects and advantages:

1. According to the embodiments of the disclosure, the longitudinal spherical aberration, field curvature aberration, and distortion are all complied with usage specifications. In addition, the off-axis rays at different heights of the three representative wavelengths of 934 nm, 940 nm and 946 nm all concentrate near the imaging points. It can be observed from the deviation amplitude of each curve that the deviation of the imaging points of the off-axis rays at different heights are under control, and the spherical aberration, aberration, and distortion are suppressed properly. The optical quality data further shows that the distances between the three representative wavelengths of 934 nm, 940 nm and 946 nm are rather close, which indicates that the rays with different wavelengths are concentrated and dispersion is suppressed properly under various conditions. In summary, the disclosure can achieve excellent optical quality by the design and arrangement of the lens elements.

2. The design of the lens parameters in each embodiment of the disclosure is, for example, as follows. When the periphery region of the light incident surface of the first lens element is concave, the second lens element has positive refracting power, the optical axis region of the light incident surface of the second lens element is concave, the periphery region of the light exit surface of the third lens element is concave, and the optical lens assembly satisfies: the thickness of the first lens element along the optical axis is greater than or equal to the sum of the two air gaps from the first lens element to the third lens element along the optical axis, and when the periphery region of the light exit surface of the second lens element is convex, or the optical axis region of the light incident surface of the third lens element is convex, aberration of the optical lens assembly is effectively improved, distortion is reduced, and the overall length of the optical lens assembly is shortened.

3. The design of the lens parameters in each embodiment of the disclosure is, for example, as follows. When the first lens element has positive refracting power, the periphery region of the light incident surface of the first lens element is concave, the periphery region of the light exit surface of the second lens element is convex, the optical axis region of the light exit surface of the third lens element is convex, and the optical axis region of the light incident surface of the third lens element is convex, aberration of the optical lens assembly is effectively improved and distortion is reduced, and when $EFL/BFL \geq 3.500$ is further satisfied, the overall length of the optical lens assembly can be reduced, wherein the preferred range of EFL/BFL is $3.500 \leq EFL/BFL \leq 17.500$.

4. The plastic material selected for each lens element of the optical lens assembly assists in lens weight reduction and production cost reduction.

The numeral range containing the maximum and minimum values obtained through the combination of proportional relationship of the optical parameter disclosed in each embodiment of the disclosure may be used for implementation.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical lens assembly, comprising a first lens element, a second lens element and a third lens element in order from a light exit side to a light incident side along an optical axis, wherein each of the first lens element to the third lens element comprises a light exit surface facing the light exit side and a light incident surface facing the light incident side, wherein the first lens element has positive refracting power, and a periphery region of the light incident surface of the first lens element is concave;

a periphery region of the light exit surface of the second lens element is convex;

an optical axis region of the light exit surface of the third lens element is convex, and an optical axis region of the light incident surface of the third lens element is convex; and lens elements of the optical lens assembly are only the first lens element to the third lens element described above, and the optical lens assembly satisfies the following condition: EFL/BFL≥3.500, wherein EFL is an effective focal length of the optical lens assembly, and BFL is a distance from the light incident surface of the third lens element to a light-emitting surface along the optical axis.

2. The optical lens assembly according to claim 1, wherein the optical lens assembly further satisfies the following condition: (T1+T2)/G23≤6.000, wherein T1 is a thickness of the first lens element along the optical axis, T2 is a thickness of the second lens element along the optical axis, and G23 is an air gap between the second lens element and the third lens element along the optical axis.

3. The optical lens assembly according to claim 1, wherein the optical lens assembly further satisfies the following condition: (G12+T3)/G23≥3.100, wherein G12 is an air gap between the first lens element and the second lens element along the optical axis, G23 is an air gap between the second lens element and the third lens element along the optical axis, and T3 is a thickness of the third lens element along the optical axis.

4. The optical lens assembly according to claim 1, wherein the optical lens assembly further satisfies the following condition: TTL/T1≤6.500, wherein TTL is a distance from the light exit surface of the first lens element to the light-emitting surface along the optical axis, and T1 is a thickness of the first lens element along the optical axis.

5. The optical lens assembly according to claim 1, wherein the optical lens assembly further satisfies the following condition: ALT/Gavg≥6.500, wherein ALT is a sum of thicknesses of the first lens element to the third lens element along the optical axis, and Gavg is an average value of air gaps from the first lens element to the third lens element along the optical axis.

6. The optical lens assembly according to claim 1, wherein the optical lens assembly further satisfies the following condition: TL/(T1+G12)≥2.750, wherein TL is a distance from the light exit surface of the first lens element to the light incident surface of the third lens element along the optical axis, T1 is a thickness of the first lens element along the optical axis, and G12 is an air gap between the first lens element and the second lens element along the optical axis.

* * * * *